United States Patent [19]

Edamura

[11] Patent Number: 4,729,504

[45] Date of Patent: Mar. 8, 1988

[54] METHOD OF BONDING CERAMICS AND METAL, OR BONDING SIMILAR CERAMICS AMONG THEMSELVES; OR BONDING DISSIMILAR CERAMICS

[76] Inventor: Mizuo Edamura, 10-9, Seiryodai 8-chome, Tarumi-ku, Kobe, Hyogo, Japan

[21] Appl. No.: 865,395

[22] Filed: May 21, 1986

[30] Foreign Application Priority Data

Jun. 1, 1985 [JP] Japan .............................. 60-119299
Mar. 20, 1986 [JP] Japan .............................. 61-63052

[51] Int. Cl.⁴ .............................................. B23K 31/00
[52] U.S. Cl. ................................. 228/122; 228/263.11
[58] Field of Search .................... 228/122, 124, 263.11

[56] References Cited

U.S. PATENT DOCUMENTS 3,226,822  1/1966  Budde et al. ........................ 228/122
3,415,556 12/1968  Dryden ................................ 228/122

FOREIGN PATENT DOCUMENTS 0137378  8/1984  Japan ............................. 228/263.11
0200871 10/1985  Japan ................................ 228/122
0231474 11/1985  Japan ................................ 228/122
1040877  2/1986  Japan ............................. 228/263.11
739929   8/1955  United Kingdom ............... 228/122

Primary Examiner—Nicholas P. Godici
Assistant Examiner—Karen Skillman
Attorney, Agent, or Firm—Rogers & Killeen

[57] ABSTRACT

A bonding method using, as bonding agent, brazing filler metal, or composite plating, or a combination of composite plating and ceramic spraying. In the first case, there are provided on the bonding region titanium powder and brazing filler metal alloyable with the titanium and having a lower melting point than titanium. The heating temperature is set higher than the melting point of the brazing filler metal but not so high to melt titanium. In the second case, the bonding region is coated with composite plating. Plating base material is made of metal alloyable with titanium and having a lower melting point than titanium. Titanium powder is diffused into the plating base material. The heating temperature is set higher than the melting point of the plating base material but not so high to melt titanium. In the last case, the bonding region is coated with the above composite plating, and further covered with ceramic spraying. The heating temperature is set in the same manner as the second case.

24 Claims, 4 Drawing Figures (280 x MAGNIFICATION)

METHOD OF BONDING CERAMICS AND METAL, OR BONDING SIMILAR CERAMICS AMONG THEMSELVES; OR BONDING DISSIMILAR CERAMICS

BACKGROUND OF THE INVENTION

1. Field of the Invention

This invention relates to a method of bonding ceramics and metal, or bonding ceramics together.

2. Description of the Prior Art

A method of bonding oxide ceramics and copper by heating them in an oxidizing atmosphere (hereafter called copper oxide method) has been known, up to now, as a method of obtaining a bonded member from ceramics and metal (see Japanese patent examined publication No. 58-3999 and Japanese patent unexamined publication No. 59-217689).

In addition, it has been suggested that the following method is used as a method of metallizing sintered ceramics: a method comprising the steps of providing sintered ceramics containing silicides which allow manganese and silicon to react at the temperature lower than the melting point of manganese, forming a Mn-containing metallic layer on the surface of the sintered ceramics, and heating the metallic layer up to the temperature lower than the melting point of manganese to cause a bonding reaction between the manganese and the silicon to occur, in which the Mn-containing metallic layer is, prior to the bonding reaction, brought to intimate contact with the surface of the sintered ceramics, so that the manganese reacts on the silicides at the temperature lower than the melting point of manganese (hereafter called bonding method with Mn-containing metal; see Japanese patent unexamined publication No. 58-204885).

In addition, the following method is also generally used: a method of comprising the steps of coating, particularly on oxide ceramics, metallizing paste such as that containing Mo-Mn powder as the main component and $SiO_2$ and CaO as additional components, sintering the oxide ceramics in a heating and reducing atmosphere to form a metallic layer thereon, and thereafter performing nickel plating, and brazing or soldering (hereafter called Mo-Mn method).

In addition, the following method is also known: a bonding method using a reaction at interfaces between ceramics and the oxgen-active metals such as Ti, Zr or Nb (hereafter called active metal method). For example, Ti-25%V-25%Cr alloy is used for alumina; the bonding is carried out at the bonding temperature of 1,550°–1,650° C. and in an inert atmosphere such as vacuum or Ar gas.

In addition, it has been also suggested, up to now, that the following adhesives are used for bonding ceramics together in connection with oxide ceramics, nitride ceramics and carbide ceramics: adhesives containing, as the effective components, at least one of sodium fluoride and calcium fluoride, or its mixture with kaolin (hereafter called ceramic adhesives; see Japanese patent unexamined publication No. 58-95668).

In addition, the following method is also known: a method of bonding metal and ceramics by applying the ceramic spraying to the surface of the conventional metallic structural member to increase corrosion resistance and heat resistance (hereafter called thermal spraying method). For example, the thermal spraying method has the following steps: the surface of the metallic structural member is roughened by grit blast; the surface preparation is carried out by the thermal spraying of the bonding metal such as molybdenum metal or Ni-5%Al alloy; and the ceramic spraying is carried out to form a ceramic spraying layer on the surface of the metallic structural member, resulting in the bonding of metal and ceramics As can be seen from above, various methods have been suggested, up to now, as the method of bonding ceramics and metal or bonding ceramics together. These methods, however, have their characteristic problems, which will be discussed below.

Considering first the above copper oxide method of the prior art, this method has the advantage of giving a good bonding strength by one heating process, but has the following problems: the heating in the oxidizing atmosphere would cause a copper oxide film to be produced on the copper surface, the copper oxide film seriously affecting the nature of the copper surface; and the heating up to a high temperature would cause the copper itself to be deformed, thereby requiring surface finish after-treatment. Furthermore, this method encounters the serious problem described below. In the case that this method is followed by the step of bonding the oxide ceramics to a metallic structural member through the thus obtained metallized surface, the use of the brazing near about 800° C. would cause cracking at the ceramics side because of the difference in coefficient of thermal expansion between the ceramics and the copper layer. Accordingly, there is no other way, in performing bonding to the metallic structural member, than to use the soldering below about 300° C., which soldering is poor in strength. Consequently, the resultant total bonding strength would become poor, and the valuable high heat resistance of the ceramics would not sufficiently be effective because of the low heat resistance of the soldering.

Considering next the above bonding method with Mn-containing metal of the prior art, this method has the following drawbacks: the Mn-containing metal layer must be in intimate contact with the ceramics during heating; the ceramics to be bonded must contain the silicides capable of reacting on the Mn-containing metal layer, i.e. $SiO_2$ and $Si_3N_4$; and thus the ceramics to be bonded are limited to the specific kinds. Furthermore, this method encounters the following problems: the heating requires the simultaneous pressurization, requiring complicated jigs and/or equipments; and since the silicides capable of reacting on the Mn-containing metal layer must be contained in the ceramics side, the characteristics of the ceramics are often degraded and the kind of the ceramics is limited to the specific ones.

Considering next the above Mo-Mn method, this method has the following drawbacks: two heating processes are needed for the sintering and the brazing or soldering; the nickel plating must be carried out between the two heating processes; and thus poor productivity is expected and complicated schedule control is required. Furthermore, this method encounters the following problems: complicated schedule of sintering-plating-brazing or soldering is required; and there remains a heterolayer in which Mo and/or W powder are mixed with brittle glassy material having a relatively low melting point, such as $SiO_2$ or CaO.

Considering next the above active metal method of the prior art, this method has the following drawbacks:

the high bonding temperature limits possible equipments and causes low productivity; and the high melting point of the brazing filler metal to be used for bonding further limits possible equipments and further reduces productivity. Furthermore, this method encounters the following problems: the high bonding temperature enlarges the difference in heat expansion between the ceramics and the metallic surface; and thus it is inevitable that the total bonding strength becomes poor.

Considering next the above ceramic adhesives of the prior art, this method has the advantage of a high bonding strength after adhesion, but the following drawbacks: the bonding surface becomes the semi-molten state during the heating and bonding, and thus it is difficult to maintain the total dimensional accuracy of the bonded two ceramics. Stating in detail, the effective components of the adhesives are rapidly diffused to the ceramics to be bonded, and the semi-molten glass layer appears at the bonding boundary between the two ceramics. Consequently, it is difficult to maintain the total dimensional accuracy of the two ceramics, and to obtain the uniform boundary layer over the whole of the bonding surface.

Considering next the above thermal spraying method, this method has the following problems: since the bonding mechanism between the metallic structural member and the ceramic spraying layer is the mechanical bonding based on the anchor effect, the bonding strength is poor, and peeling would be caused by the shearing stress which appears at the bonding boundary because of the difference in coefficient of thermal expansion between the metallic structural member and the ceramic spraying layer; and thus the possible temperature range in use is limited, and the life is reduced. For example, the bonding region derived from the thermal spraying of molybdenum metal or Ni-5%Al uses the mechanism, to increase the bonding strength, of the combination of the roughened metallic surface and the sublimation of the oxide film of the molybdenum metal at a relatively low temperature, or uses the mechanism, to increase the bonding strength, of the exothermic reaction under alloying of the Ni-5%Al. These mechanisms are the mechanical bonding based on the anchor effect, resulting in that the bonding strength between the metallic structural member and the ceramic spraying layer is, at maximum, lower than 200-250 kg/cm$^2$, and the ceramic spraying layer might peel off because of the thermal load and the working stress in use.

DESCRIPTION OF THE INVENTION

It is accordingly an object of the invention to provide an industrially useful method of bonding ceramics and metal, or bonding ceramics together, which method solves all the problems of the above prior art methods, permits a stable, high bonding strength to be obtained by one heating process, and easily maintains the total dimensional accuracy of the members to be bonded.

Another object of the invention is to provide an industrially useful method of bonding metal and ceramics with a ceramic spraying process, which method solves all the problems of the above prior art methods of bonding ceramics and metal with the ceramic spraying method, permits the chemical bonding to occur between the metallic structural member and the ceramic spraying layer to realize a stabler, higher bonding strength, and permits the heat resistance and the life of the metallic structural member to be increased.

The inventor have earnestly investigated to accomplish the above objects, and have developed the invention with the knowledge of the following fact: if the bonding region between ceramics and metal and so on is provided with: titanium or Ti-containing particles; and metallic agent which is alloyable with the titanium or Ti-containing particles, and which has a lower melting point than the titanium or Ti-containing particles; the metallic agent being sufficiently in contact with the titanium or Ti-containing particles, and if the metallic agent is melted in vacuum while a part of the titanium or Ti-containing particles are diffused into the metallic agent, such a bonding method can solve all of the above problems and can obtain a bonded member having particularly a high bonding strength between ceramics and metal and so on.

It has been generally noted that titanium has, in the molten state, good wettability to ceramics and has diffusivity into ceramics as well. Accordingly, various brazing filler metals have been developed with the use of such characteristics of titanium.

It should be, however, noted that the brazing filler metal containing a large amount of titanium has undesirably a high melting point: for example, Ti-Cu binary alloy with 20 wt% Ti has a melting point of 890° C. and with 33 wt% Ti 970° C.; Ti-Ni binary alloy has the lowest melting point of 960° C. with 27 wt% Ni.

Since the brazing temperature is set about 50°-150° C. higher than the melting point of the brazing filler metal, the actual bonding temperature in the case of using the above brazing filler metal becomes inevitably a high temperature of 940°-1120° C.

As the result, poor bonding working condition is expected, and the high-temperature heating would cause a high internal stress even with a small difference in coefficient of thermal expansion between the members to be bonded, resulting in poor bonding property. Furthermore, such brazing filler metal containing a large amount of titanium, in general, is brittle and has low ductility after brazing.

Considering, on the other hand, brazing filler metal containing a small amount of titanium, such as silver solder, copper solder, and nickel solder, these solders have the advantage of certain ductility even with relatively low melting points, but have the disadvantage of poor wettability to ceramics so that sufficient bonding property is not expected.

Under the circumstances, there is provided the invention of a method of bonding ceramics and metal, or bonding ceramics together comprising the steps of: preparing titanium or Ti-containing particles; preparing brazing filler metal which is alloyable with the titanium or Ti-containing particles, and which has a lower melting point than the titanium; providing bonding regions, between the members to be bonded, with the titanium or Ti-containing particles and the brazing filler metal with the condition that they are separate or have not been alloyed yet, e.g. one or both of them are made plate-like, and they are in contact with each other; and heating the members to be bonded to a temperature which permits the brazing filler metal of the low melting point to be melted, but the titanium or Ti-containing particles to remain solid.

Stating concretely, for the invention, the brazing filler metal having a lower melting point than the titanium or Ti-containing particles is made plate-like or wire-like, or is a plated layer into which the titanium or Ti-containing particles are diffused, for being applied to the bonding region.

It should be noted that the term Ti-containing particles is to represent: particles containing Ti particles and other metal particles; particles containing Ti particles and other compounds; or Ti particles only.

Considering next the case of providing the bonding region with, as bonding agent, the plated layer with the diffused Ti-containing particles, this method comprising the steps of: preparing plating base material made of metal or alloy which is alloyable with the titanium or Ti-containing particles, and has a lower melting point than the titanium or Ti-containing particles; applying composite plating to the bonding region by using said metal or alloy; and heating the members to be bonded to a temperature which permits the plating base material of the low melting point to be melted, but the Ti-containing articles diffused and included in the plating base material to remain solid. With this method, the plating base material and the titanium or Ti-containing particles are partly alloyed, so that the composite plating layer effectively serves as the brazing filler metal.

Now, there will be discussed the case of providing the bonding region with the brazing filler metal into which only the titanium is added, or the composite plating layer into which only the Ti particles are dispersed. In the initial stage of heating, the brazing filler metal or the plating base material is melted, and fills liquid-tightly the space among the ceramics and metal to be bonded and the titanium or its powder particles which remain solid, and is in contact with the titanium or its powder particles with good wettability. Since the titanium or its powder particles has the property that they are alloyable with the above brazing filler metal or the plating base material, subsequent heating permits the titanium or its powder particles to be partly dissolved and diffused into the brazing filler metal or the plating base material. Such diffusion will permits the brazing filler metal or the plating base material itself to have sufficient wettability to the ceramics.

Furthermore, the diffused titanium or its powder particles are further diffused into the ceramics, thereby greatly contributing to an increase of the bonding strength of the ceramics. On the other hand, the amount of the titanium or its powder particles in the brazing filler metal or the plating base material is reduced because of such diffusion into the ceramics. However, the brazing filler metal or the plating base material is successively replenished with titanium from the solid titanium or its powder particles which are in contact with the brazing filler metal or the plating base material with good wettability. Accordingly, the titanium content of the melted brazing filler metal or the melted plating base material are maintained constant, and can be set minimum by controlling the heating temperature and the heating time.

Consequently, this method has the following advantages: there is no evil of excessive titanium in the brazing filler metal or the plating base material after the heating process; the brazing filler metal or the plating base material maintains its ductility; and since the titanium itself has a relatively small coefficient of thermal expansion and the heating is carried out at a low temperature as well, there is a little influence on deterioration of the bonding property which might be caused by the residual stress. The solid titanium or its powder particles are reduced in amount during the heating process because of dissolution and diffusion into the brazing filler metal or the plating base material. Accordingly, if the initial amount of the titanium or its powder particles and the heating temperature and time are set appropriately, substantially no titanium or its powder particles will remain, after the heating process, in the brazing filler metal or the plating base material. It should be noted, however, that even if the titanium or its powder particles remain, it will not affect the bonding property of the ceramics, and thus this remainder would not necessarily be avoided.

The above example method can be improved by performing the heat bonding in the inert atmosphere, i.e. in vacuum. With this improvement, there is improved, in the initial stage of heating, the wettability of the brazing filler metal or the plating base material to the titanium or its powder particles. Furthermore, there is improved the wettability of the brazing filler metal or the plating base material per se to the ceramics because of dissolution and diffusion of the titanium or its powder particles into the brazing filler metal or the plating base material.

As can be seen from above, the bonding method of the invention has the following advantages: the good wettability and diffusivity of the titanium to the ceramics are sufficiently used; the heating temperature for bonding is set low; and thus the bonding strength between the ceramics and metal and so on are greatly improved, and the bonding working condition can be improved.

In particular, the bonding method comprising the step of providing the bonding region with the diffusion plating layer has the following advantages: nothing is needed more than to apply the composite plating containing the Ti-containing particles to only the bonding region with the required thickness, and thus it is not necessary to place other brazing filler metal unstably on the bonding region; and the composite plating can be applied to only the bonding region for any of the metallic structural member and the ceramics, and thus the productivity can be improved with advanced rationalization.

On the other hand, the method of bonding metal and ceramics with the ceramic spraying comprises the steps of: applying, beforehand, the composite plating which permits the Ti-containing particles to be diffused, with the required thickness, only to the region to be ceramic sprayed of the metallic structural member; applying the ceramic spraying layer on to the composite plating layer; and thereafter heating the ceramic spraying layer as well as the metallic structural member in the inert atmospher, e.g. in vacuum. In this method, any heating means may be used: the overall heating may be used, or the local heating may be used with scanning to successively melt the plating base material, or the hot hydrostatic pressurizing method may be used. Since the mechanism of the chemical bonding between the ceramic spraying layer and the metallic structural member is similar to that between the ceramics and metal, the constitution of the titanium or Ti-containing powder particles in the composite plating, the constitution of the plating base material, and the heating temperature and time are similar to those previously described.

It should be noted, however, that the plating base material between the ceramic spraying layer and the metallic structural member becomes temporarily the molten state during heating, and thus in the case of a broad area to be covered with the ceramic spraying it is necessary to apply pressure during heating. In view of this, it is preferable to use the hot hydrostatic pressurizing method.

The bonding method with the ceramic spraying has the following advantages: the good wettability and diffusivity of the titanium to the ceramics are sufficiently used; the composite plating containing the Ti-containing powder particles is applied, with the required thickness, only to the region to be ceramic sprayed of the metallic structural member, and thereafter the heating process is carried out; and thus the ceramic spraying layer and the metallic structural member is chemically bonded, so that the bonding strengh of the layer is improved and the working condition of the ceramic spraying can be improved as well.

It should be noted that the bonding method of the invention described above involves the method of bonding ceramics and metal, or bonding similar ceramics together, or bonding dissimilar ceramics.

It should be further noted that the term ceramics above is to represent all of the known ceramics: oxide ceramics, nitride ceramics, carbide ceramics and so on.

The metal to be bonded with the ceramics has no limitation more than to have a higher melting point than the brazing filler metal or the plating base material: the metal may be pure metals such as Ti, Cu, Fe, Ni, or their alloys, or alloys of these metals with other kinds of metals.

The term bonding between similar ceramics together is to represent, for example, bonding between oxide ceramics together, bonding between nitride ceramics together, bonding between carbide ceramics together and so on. And the term bonding between dissimilar ceramics is to represent, for example, bonding between oxide ceramics and nitride ceramics, bonding between oxide ceramics and carbide ceramics and so on.

In the invention, the brazing filler metal or the plating base material to be provided on the bonding region has no limitation more than to be alloyable with the titanium or Ti-containing particles and to have a lower melting point than the titanium; such a material has, in general, good wettability to the titanium or Ti-containing particles during heating in vacuum.

The brazing filler metal may be selected from any of the known ones: for example, silver solder (72% Ag, 28% Cu), Li-containing silver solder (72% Ag, 27.8% Cu, 0.2% Li), palladium solder (10% Pd, 58% Ag, 27% Cu), palladium solder (10% Pd, 58% Ag, 27% Cu), copper solder (100% Cu), copper alloy solder (68% Cu, 22% Mn, 10% Ni), or gold solder (38% Au, 62% Cu), noting that the percentages in the parentheses represent weight %.

If the brazing filler metal contains, as a part of it, at least one of manganese and molybdenum, preferably both of them, the bonding property is improved because they accelerate the dissociative reaction at the ceramic surface as they are heated and melted. It is thus very preferably to use such components for the brazing filler metal in the invention.

In the invention, the provision of the titanium and the brazing filler metal on the bonding region is carried out in the following manner: first, the brazing filler metal and the titanium are made close to each other, and are provided on the bonding region between similar ceramics, or between dissimilar ceramics. The provision may be carried out with any means, which may be selected in response to a combination of the titanium and the kind of the brazing filler metal to be used. The shapes of the titanium and the brazing filler metal may be selected from various ones: plate-like, powder-like, particle-like, coated layer, or their combination. Part of or all of the components of the brazing filler metal may be alloyed beforehand, or may not be alloyed, i.e. simple substance.

For example, the plate-like shape may be made by placing a required amount of brazing filler metal foils on the both sides of a titanium foil to form a clad plate, which is very convenient for use. On the other hand, the wire-like or powder-like titanium may be coated, on its surface, with nickel plating and copper plating with the amounts corresponding to the percentages of the silver solder (described above), so that the required contents of the silver solder is obtained after melted. These metals are alloyed during heating, and serve as the components of the brazing filler metal to give the effect of the invention.

In the case of using the clad plate made of the titanium and the brazing filler metal, the clad plate may be covered, on its ceramic bonding side, with the Li-containing silver solder (described above) which has better wettability to ceramics, and on its metal (made of Ni, Fe, or their alloy) bonding side, with the palladium solder (described above) which has good bondability to such metals. The thus obtained clad plate permits the ceramics and the metal to be firmly bonded by one heating process because the both brazing filler metals have similar melting points.

At least a part of the brazing filler metal, for example in the case of using molybdenum or manganese described above, may be provided on the bonding region by means of coating paste containing said part of the brazing filler metal mixed with screen oil.

The required amount of the brazing filler metal to be provided for the above various manners is, for example in the case of using the plate-like titanium and the ordinary butt brazing method, preferably 20–100 mg per 1 $cm^2$ area of one side butting surface of the titanium. The amount is, of course, freely selected or determined based on the shape to be bonded, the desired solidified shape of the brazing filler metal after bonding, or the required property. The amount of the titanium is also not restricted to a specific value, and the titanium is provided on the overall bonding region. The amount and shape of the titanium is freely selected or so determined that even if a part of the titanium remains after heat-and-cooling this part gives no problems in practical use.

Since the invention uses, as described, the following bonding mechanism: a part of the titanium coexistent with the brazing filler metal is diffused into the brazing filler metal during heating in vaccum, so that the wettability to the ceramics is obtained; and thereafter the titanium is further diffused into the ceramics, it is not necessary, for the provision of the brazing filler metal, to apply troublesome pretreatment to the bonding region of the ceramics, that is nothing is needed more than to perform cleaning to obtain a clean surface.

After the provision of the bonding agent in the above described manner, heating in vacuum is carried out. The heating temperature is so determined that the brazing filler metal is melted but the titanium remains solid, i.e. the brazing filler metal and the titanium are not, as a whole, melted and not alloyed. In general, the temperature is set and held at 50°–150° C. higher than the melting point of the brazing filler metal or the temperature of the liquid phase point.

The holding time of heating is selected in response to the amount of the titanium to be dissolved and diffused into the molten brazing filler metal, the amount being determined in response to the bonding manner. The dissolved amount is a function of the heating temperature and time; the holding time is set usually 2-30 minutes satisfactorily. The heating temperature and time for the invention is not so different to those for the bonding between metallic members, greatly contributing to an increase of the productivity.

The vacuum pressure for the heating process is preferably not higher than $1 \times 10^{-3}$ mmHg to avoid the high temperature oxidation of the titanium and to increase the wettability of the brazing filler metal, more preferably not higher than $1 \times 10^{-4}$ mmHg.

Using the above heating process, the following phenomena will occur: in the initial stage of heating, the brazing filler metal is first melted and in contact with the titanium surface with good wettability; thereafter the titanium is gradually dissloved and diffused into the molten brazing filler metal, and thus the brazing filler metal itself is in contact with the ceramics with good wettability; finally the titanium diffused in the brazing filler metal is further diffused into the ceramics. An amount of titanium corresponding to that of the thus consumed titanium by diffusion is supplied, to the equilibrium value, from the titanium which is in contact with the brazing filler metal.

Since the above equilibrium amount can be regulated to the minimum requirement by controlling the heating temperature and other conditions, the brazing filler metal holds good wettability after the heating process. Accordingly, on account of the good wettability of the molten brazing filler metal to the ceramics, and the diffusion of the titanium into the ceramics, there is obtained good bonding property or a bonded member having a very high bonding strength between the ceramics and metal.

In the above bonding method, there may be beforehand provided on the bonding region, together with the brazing filler metal and the titanium, at least one or more kinds of compounds selected from the group consisting of nitrides, carbides, and borides of titanium or zirconium. With this measure, the wettability of the brazing filler metal to the ceramics is further increased, and the high temperature is usable without losing ductility of the solidified brazing filler metal, and the shape holding function of these compounds is expected during heating and melting of the brazing filler metal because of high melting points of these compounds.

Of the compounds, TiC has a good electric conductivity. Thus, in the case of making a print board from the ceramics, the titanium powder, and the brazing filler metal powder, TiC may be mixed with the above powders. Consequently, since the brazing filler metal itself has good wettability to the TiC, the shape holding function based on the high melting point of the TiC permits the brazing filler metal not to excessively flow to the ceramics, resulting in easy manufacturing of the print board.

These compounds are usually used with a powder form of about 150 mesh pass, and their required amounts are 0.1-20 weight part to 100 weight part of the brazing filler metal, more preferably about 0.1-10 weight part. In providing these compounds on the bonding region, the compounds may have been mixed, with powder forms, with the brazing filler metal, or may be mixed with organic binder such as screen oil and coated on the bonding region of the ceramics and thereafter dried.

The plating base material may be selected from Ag, Cu, Ni, alloy plating of Ag and Cu, alloy plating of Au and Cu, laminated plating of Ag and Cu, laminated plating of Ni and Cr.

For the alloy platings and the laminated platings, the liquid composition or the plating condition may be so selected to obtain, for example, (72% Ag, 28% Cu) or (38% Au, 62% Cu). Such composite plating on the bonding region may be carried out by any method: the electroplating; the electroless plating; or in the case of bonding ceramics together, a very thin (about 1 μm) layer is first formed by the electroless plating to give electric conductivity, and thereafter a layer of the required thickness is applied on the thin layer by the electroplating.

The composite plating on the bonding region may be applied to the both surfaces to be bonded, or to one side with the required amount.

The composite plating may contain, as its component, molybdenum power particles or chromium and molybdenum powder particles in addition to the titanium powder particles. These powder particles have the function of accelerating the dissociative reaction at the ceramic surface during heating, and the powder particles and various elements (e.g. Al, O, Si, and N) dissociated from the ceramic surface with a very small amount are dissloved to each other and give a high bonding strength, to give good influence on the bonding property. Accordingly, such blending of the composite plating is more preferable for the invention.

Furthermore, the composite plating may contain as its component, in addition to the blending of Ti, Mn and Mo powder particles or the blending of Ti, Cr and Mo powder particles, at least one or more kinds of powder particles selected from Ni, Co and Fe. With this blending, these powder particles and various elements (e.g. Si and C) dissociated from the carbide ceramic surface with a very small amount are dissolved to each other and give a high bonding strength, to give good influence on the bonding property especially of the carbide ceramics.

Furthermore, the composite plating may contain, in addition to the blending of the powder particles described above for each plating, at least one or more kinds of powder particles selected from nitride, carbide and boride of titanium or zirconium. With this blending, the wettability of the plating base material to the ceramics are further increased, and the strength as well as the ductility of the solidified plating base material are increased, and the shape holding function of these compounds is expected during heating and melting of the plating base material because of high melting points of these compounds.

The physical property and chemical property of these compounds will be seen in Table 1. As can be seen from this table, any of these compounds has a small coefficient of thermal expansion. Selecting and combining one or more kinds of these compounds, the coefficient of thermal expansion of the brazing filler metal and/or the plating base material can approach that of the ceramics to be bonded with, and thus these compounds are usuful to reduce the thermal stress as well.

TABLE 1

| Titanium or Zirconium Compounds | Melting Point (°C.) | Density (g/cm³) | Coefficient of Thermal Expansion ($\times 10^{-6}$/°C.) | Hardness (Vickers) | Principal Property |
|---|---|---|---|---|---|
| TiN | 2,950 | 5.21 | 9.35 | 2,450 | Oxidation Resistance at High Temperature Wear Resistance |
| TiC | 3,140 | 4.52 | 7.4 (25–800° C.) | 3,250 | Electric Conductivity at High Temperature Heat Resistance |
| TiB$_2$ | 2,600 | 4.50 | 6.4 (25–1,300° C.) | 3,480 | Oxidation Resistance at High Temperature |
| ZrN | 2,980 | 6.93 | 6.0 | 1,990 | Wear Resistance Termal Shock Resistance |
| ZrC | 3,530 | 6.70 | 6.7 (25–800° C.) | 2,600 | Wear Resistance Oxidation Resistance at High Temperature |
| ZrB$_2$ | 3,000 | 6.10 | 9.05 (0–1,000° C.) | 2,200 | Oxidation Resistance at High Temperature |

In the invention, the metal powder particles used for the composite plating may have any shape and size, that is they have no restriction more than to be uniformly dispersable into the plating base material. The particle size is usually 0.5–10 μm.

The amounts of the metal powder particles to be contained in the composite plating layer may be any value. Since the dissolved and diffused amount of each metal element into the plating base material is dependent upon the heating temperature, all amounts of the metal elements can be dissolved and diffused into the plating base material, or some amounts can remain. On the other hand, the amounts of the nitride, carbide, and boride of titanium or zirconium also may be any value, or so determined that the solidified plating base material has appropriate mechanical property or an appropriate coefficient of thermal expansion.

Considering such conditions, there was determined a preferable amount to be diffused in the plating base material for each kind of the powder particles, which amount will be shown in Table 2.

In the invention, the bonding regions covered with the composite plating are brought to contact with each other, and heated in the inert atmosphere, i.e. in vacuum. The heating temperature is set and held at 50°–150° C. higher than the melting point or the temperature of liquid phase point of the plating base material, like the above-described case of the provision of the brazing filler metal on the bonding region.

The holding time of heating is selected, like the above-described case of the provision of the brazing filler metal on the bonding region, in response to the amounts of the titanium and other metal elements to be dissolved and diffused into the molten plating base material, the amounts being determined in response to the bonding manner. The holding time is set usually 2–30 minutes satisfactorily. The heating temperature and time for the invention is not so different to those for the bonding between metallic members, greatly contributing to an increase of the productivity.

TABLE 2

| Embodiment | Blending Component (Weight %) | | | | | Weight Part *1 |
| | Ti Powder | Mo and Mn Powder | Mo and Cr Powder | Total of One or More Kinds of Ni, Co, Fe | Plating Base Material | Total of One or More Kinds of Nitride, Carbide, Boride of Ti or Zr |
|---|---|---|---|---|---|---|
| Embodiment of Claim 3 | 0.5–10 Preferably 3–8 | | | | Ag, Cu, Ni or Ag—Cu Alloy | |
| Embodiment of Claim 4 | Same as Above | Mo 0.005–5 Mn 0.005–5 Preferably Mo 0.01–3 Mn 0.01–3 | | | Ag—Cu Laminated Ni—Cr Laminated Plating Remainder | |
| Embodiment of Claim 5 | Same as Above | | Mo 0.005–5 Cr 0.005–5 Preferably Mo 0.005–1 Cr 0.005–1 | | | |
| Embodiment of Claim 6 | Same as Above | Same as Embodiment of Claim 2 or 3 | | 0.1–5 Preferably 0.1–3 | | |
| Embodiment of Claim 7 | Same as Embodiment of Claim 1, 2, 3 or 4 | | | | | 0.1–20 Preferably 0.1–10 |

Note: *1 Weight part to 100: total of metal powders and plating base material.

The vacuum pressure for the above heating process is, like the above-described case of the provision of the brazing filler metal, preferably not higher than $1 \times 10^{-3}$ mmHg, for example, to avoid the high temperature oxidation of the titanium and to increase the wettability of the plating base material, more preferably not higher than $1 \times 10^{-4}$ mmHg.

The bonding principle and mechanism with the above heating process is substantially similar to those of the above-described case of the provision of the brazing filler metal.

In the above bonding method using the composite plating, there may be provided beforehand on the bonding region, together with the plating base material and the titanium, at least one or more kinds of compounds selected from the group consisting of nitrides, carbides, and borides of titanium or zirconium.

These compounds are usually used with a powder form of about 0.5-10 μm size, and their required amounts are 0.1-20 weight part to 100 weight part of the composite plating base material, more preferably about 0.1-10 weight part.

The above bonding method may be accompanied with the ceramic spraying; the spraying material may be any of the known ones, such as alumina series, zirconia series, titania series, mullite series, silicon nitride series, or silicon carbide series. The spraying means may be any known ones, such as arc spraying, flame spraying, or plasma spraying.

The substrate metal or metallic structural member to which the thermal spraying is applied has no restriction more than to have a higher melting point than the plating base material: for example, pure metals such as Ti, Cu, Fe, and Ni, or their alloys, or alloys of these metals and other metals.

In using the bonding method accompanied with the ceramic spraying, the composite plating containing the required powder particles is applied beforehand, with the required thickness, only to the region, to which the ceramic spraying will be applied, of the metallic structural member. The blending amounts of the powder particles, their combination, and the composition of the plating base material are similar to those for the above-described composite plating.

Next, the ceramic spraying layer is heated in vacuum together with the metallic structural member. The heating means may be any of the known ones: the overall heating may be used, or the local heating may be used with scanning, or the hot hydrostatic pressurizing method may be used.

The principle of the chemical bonding between the ceramic spraying layer and the metallic structural member is consistent with the above-described bonding principle between the ceramics and metal. Accordingly, the conditions, such as the heating temperature and time and the vacuum pressure, may be similar to those previously described. The thickness of the ceramic spraying layer is usually 0.1-2.5 mm, preferably about 0.2-1.5 mm.

Since the ceramic spraying layer is thin, it is preferable, for the heating process, to apply pressure uniformly from the ceramic side toward the metallic structural member side to allow them to be brought into intimate contact.

In the bonding method using the composite plating on the bonding region, where the metal to be bonded is titanium or its alloys, it is not necessary to use the titanium powder particles contained in each of the composite plating shown in Table 2. Because, during heating and melting of the plating base material, titanium element is dissolved out from the surface of the titanium or its alloy into the molten plating base material with an amount depending upon the heating temperature and time. Accordingly, with this embodiment, it is sufficient that the composite plating layer contains the powder particles of only the other metal elements and compounds than the titanium powder particles, to obtain the same effect as previously-described example. It should accordingly be noted that such a embodiment is within a scope of the invention.

As can be seen from above, the invention provides a method of bonding ceramics and metal, or bonding similar ceramics together, or bonding dissimilar ceramics comprising the following steps: titanium or Ti-containing particles are prepared; there is prepared brazing filler metal having wettability to the titanium or Ti-containing powder particles and having a low melting point and alloyable with the titanium, or there is prepared plating base material into which the titanium has been diffused; the titanium or Ti-containing powder particles and the brazing filler metal or plating base material are provided on the bonding region; they are heated in vacuum at a temperature which permits the brazing filler metal or plating base material to be melted, so that the titanium or Ti-containing powder particles are diffused into the brazing filler metal or plating base material, and further diffused into the ceramicsthrough the brazing filler metal or plating base material; powder particles of other metal elements and their compounds are added as required, so that dissociative reaction of the ceramics is accelerated at the bonding surface simultaneouly with the diffusion, and these added metals and compounds are strongly bonded with the dissociated elements. The invention having such constitution can solve all of the problems of the prior art bonding method. In particular, the invention can obtain a stably, high bonding strength by one heating process with any condition irrespective of kinds and shapes of the ceramics and metal. Furthermore, the total dimensional accuracy of the bonded members is maintained good, and the heating temperature is easily controlled to permit the mass production, and thus a industrially usuful bonding method is provided.

Where the bonding method is accompanied with the ceramic spraying, the chemical bonding between the ceramic spraying layer and the metallic structural member is realized by directly using the bonding principle and mechanism between the ceramic and metal, so that the bonding strength between the ceramic spraying layer and the metallic structural member is increased. Furthermore, the ceramic spraying permits the heat resistance and the life of the metallic structural member to be increased.

WORKING EXAMPLES

Figure 1:
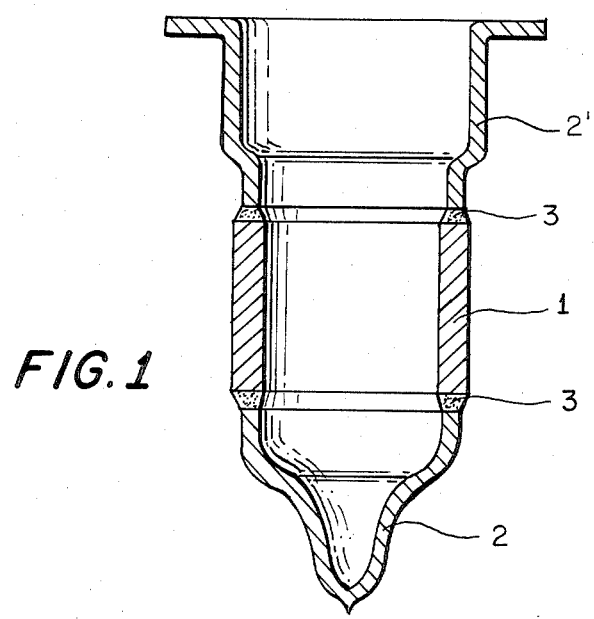
FIG. 1 is a cross-sectional view showing a part of an electronic tube having a bonded structure between ceramics and metal according to the invention.

Examples of the invention will now be described concretely below, with the cases of provision of the brazing filler metal and the composite plating separately. It should be noted that, in the below description, the term % represents weight %, and the term part represents weight part.

The silver solder and Li-containing silver solder used in the examples of the brazing filler metal case are to have the metal composition described previously. That is, the silver solder has the composition of 72% Ag and 28% Cu, and the Li-containing silver solder has 72% Ag, 27.8% Cu and 0.2% Li.

(The Bonding Method with the Brazing Filler Metal on the Bonding Region)

EXAMPLE 1

A ceramic cylinder with 80% alumina content was placed on a ceramic disk with 80% alumina content. A titanium foil of 1.5 cm square with a thickness of 100 μm was placed on the bonding region, and silver solder or Li-containing silver solder with a thickness of 100 μm was brought into good contact with the both surfaces of the titanium foil. The amount of the silver solder or Li-containing solder was 38.9 mg per 1 cm² area of one side surface of the titanium.

Separately from the above sample, a silicon nitride ceramic member of 10 mm square with a thickness of 3 mm was placed on a ceramic disk with 80% alumina content. A titanium foil of 1 cm square with a thickness of 100 μm was placed on the bonding region, and silver solder or Li-containing silver solder with the composition described above was brought into good contact with the both surfaces of the titanium foil.

The above two types of assemblies were heated in a vacuum furnace at 880° C. for 7 minutes, and thereafter cooled in the furnace, and taken out to obtain four kinds of bonded samples. It was found that a part of titanium remained at the bonding region for each of the bonded samples. The bonding property for each bonded sample will be shown in Table 3 below.

TABLE 3

| Brazing Filler Metal | Combination of (1) Members to be Bonded | Bending Strength (2) $\sigma_{max}$ (kg/mm²) |
|---|---|---|
| Silver Solder | A | 7.39 (*1) |
| Li-Containing Silver Solder | | 6.26 (*1) |
| Silver Solder | B | — (*2) |
| Li-Containing Silver Solder | | —(*2) |

Note (1): A - 80% alumina cylinder and 80% alumina disk.
B - 80% alumina cylinder and silicon nitride rectangular plate.
Note (2): *1 - No braking of brazing filler metal part but ceramic braking.
*2 - No bending test, strong bonding.

EXAMPLE 2

A ceramic cylinder with 80% alumina content was placed on a ceramic disk with 80% alumina content. A titanium foil of 1.5 cm square with a thickness of 100 μm was placed on the bonding region, and silver solder with a thickness of 100 μm was brought into good contact with the both surfaces of the titanium foil. The amount of the silver solder was 38.9 mg per 1 cm² area of one side surface of the titanium. Furthermore, the bonding region was beforehand coated with paste made of nitride, carbide, or boride of titanium or zirconium (each has a 250-mesh pass size) mixed with screen oil, and fully dried; the amounts of these compounds are represented by part numbers, which will be shown in table 4, to 100 part of the brazing filler metal.

Separately from the above sample, a silicon nitride ceramic member of 10 mm square with a thickness of 3 mm was placed on a ceramic disk with 80% alumina content. A titanium foil and Li-containing silver solder were placed on the bonding region with the same operation and amounts as above. Furthermore, the bonding region was coated with TiB₂, as a titanium compound, with the same manner as above, and thereafter dried.

The above two types of assemblies were introduced into a vacuum furnace, and heated at 880° C. for 7 minutes under a vacuum pressure of 5×10⁻⁵ mmHg, and thereafter cooled in the furnace, and taken out to obtain ten kinds of bonded samples. It was found that a part of titanium remained at the bonding region for each of the bonded samples. The bonding property for each bonded sample will be shown in Table 4 below.

TABLE 4

| Brazing Filler Metal | Kind of Ti or Zr Compound | (Part) | Combination of (1) Members to be Bonded | Bending Strength (2) $\nu_{max}$ (kg/mm²) |
|---|---|---|---|---|
| Silver Solder | TiN | (1) | A | 8.53 (*1) |
| Silver Solder | TiN | (3) | | 7.73 (*1) |
| Silver Solder | TiN | (10) | | 7.28 (*1) |
| Silver Solder | TiB₂ | (1) | | 7.85 (*1) |
| Silver Solder | TiB₂ | (3) | | 7.73 (*1) |
| Silver Solder | TiB₂ | (10) | | 6.48 (*1) |
| Silver Solder | ZrN | (3) | | 6.82 (*1) |
| Silver Solder | TiC | (3) | | 5.12 (*1) |
| Silver Solder | ZrC | (3) | | 6.26 (*1) |
| Li-Containing Silver Solder | TiB₂ | (3) | B | — (*2) |

Note (1): A - 80% alumina cylinder and 80% alumina disk.
B - 80% alumina cylinder and silicon nitride rectangular plate.
Note (2): *1 - No braking of brazing filler metal part but ceramic braking.
*2 - No bending test; strong bonding.

EXAMPLE 3

A ceramic cylinder with 80% alumina content was placed on a ceramic disk with 80% alumina content. A titanium foil of 1.5 cm square with a thickness of 100 μm was placed on the bonding region, and silver solder or Li-containing silver solder with a thickness of 100 μm was brought into good contact with the both surfaces of the titanium foil. In this example, the amount of the silver solder or Li-containing solder was varied: 23.4 mg, 31.1 mg, 38.9 mg, and 77.8 mg per 1 cm² area of one side surface of the titanium, and the bonding property was examined for each amount.

The above assemblies were introduced into a vacuum furnace, and heated at 880° C. for 7 minutes under a vacuum pressure of 5×10⁻⁵ mmHg, and thereafter cooled in the furnace, and taken out to obtain six kinds of bonded samples. It was found that a part of titanium remained at the bonding region for each of the bonded samples. The bonding property for each bonded sample will be shown in Table 5 below.

TABLE 5

| Brazing Filler Metal Kind | Amount (1) (mg/cm²) | Bending Strength (2) $\sigma_{max}$ (kg/mm²) |
|---|---|---|
| Silver Solder | 23.4 | 7.17 |
| | 31.1 | 9.41 |
| | 38.9 | 7.39 |
| | 77.8 | 8.53 |
| Li-Containing Silver Solder | 38.9 | 7.62 |
| | 77.8 | 7.39 |

Note (1): Weight of brazing filler metal per 1 cm² area of one side surface of titanium.
Note (2): No braking of brazing filler metal part but ceramic braking.

EXAMPLE 4

A ceramic cylinder with 80% alumina content was placed on a ceramic disk with 80% alumina content. A titanium foil of 1.5 cm square with a thickness of 100 $\mu$m was placed on the bonding region, and silver solder with a thickness of 100 $\mu$m was brought into good contact with the both surfaces of the titanium foil. The amount of the silver solder was 38.9 mg per 1 cm$^2$ area of one side surface of the titanium foil. Furthermore, the bonding region was beforehand coated with paste made of zirconium boride or mixture of Mo powder and Mn powder with 1:1 ratio (each has a 250-mesh pass size) mixed with screen oil for ceramics, and fully dried; the amounts of these boride and mixture are represented by part numbers, which will be shown in table 6, to 100 part of the brazing filler metal.

The above assemblies were introduced into a vacuum furnace, and heated at 860° C. for 15 minutes under a vacuum pressure of $5 \times 10^{-5}$ mmHg, and thereafter cooled in the furnace, and taken out to obtain three kinds of bonded samples. It was found that a part of titanium remained at the bonding region for each of the bonded samples. The bonding property for each bonded sample will be shown in Table 6 below.

TABLE 6

| Brazing Filler Metal | Zirconium · Boride or Mixture of Mo and Mn | (Part) | Bending Strength (1) $\sigma_{max}$ (kg/mm$^2$) |
|---|---|---|---|
| Silver Solder | ZrB$^2$ | (1) | 6.03 |
| Silver Solder | ZrB$_2$ | (10) | 7.05 |
| Silver Solder | Mo<br>Mn | (2)<br>(2) | 5.75 |

Note (1): No braking of brazing filler metal part but ceramic braking.

EXAMPLE 5

A tungsten carbide member (a parallelopiped of 5 mm $\times$ 11 mm $\times$ 14 mm) was placed, at its 5 mm $\times$ 11 mm surface, on a silicon nitride or silicon carbide ceramic disk with 32 mm in diameter and 3 mm in thickness. The bonding region was coated with paste made of the brazing filler metal powder with the blending composition shown in Table 7 (each powder has a 250-mesh pass size) mixed with screen oil, and fully dried.

The above two types of assemblies were introduced into a vaccum furnace, and heated at the condition shown in Table 7 under a vacuum pressure of $1 \times 10^{-4}$ mmHg, and thereafter cooled in the furnace, and taken out to obtain two kinds of bonded samples. The bonding property for each bonded sample will be shown in Table 7. Each of the bending strengths shown in Table 7 was measured by applying a load vertically against the 11 mm $\times$ 14 mm surface of the tungsten carbide parallelopiped.

As can be seen from the results of the above examples, The mothod according to the invention can produce a bonded member having a high bonding strength with good working condition.

(The Bonding Method with the Composite Plating Layer on the Bonding Region)

EXAMPLE 6

FIG. 1 is a cross-sectional view showing a part of an electronic tube having a bonded structure between ceramics and metal according to the invention. A metallic (Cu) input part 2 and a metallic (Cu) input base member 2' were piled and bonded, at bonding regions 3, to an alumina ceramic cylinder 1; the bonding was carried out by heating the below-mentioned composite plating layers.

Figure 2:
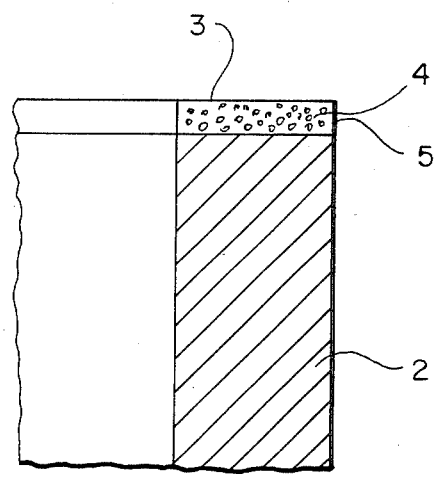
FIG. 2 is an enlarged view of a part of the bonding region of the input part of the electronic tube shown in FIG. 1, showing a state after composite plating but before heating.

FIG. 2 is an enlarged view of a part of the bonding region of the input part 2, showing a state after composite plating but before heating. The bonding-side end surface of the input part was coated with a composite plating layer 3 with 150 $\mu$m in thickness. The composite plating layer 3 contained 7% Ti powder particles and three-part ZrB$_2$ powder particles (the "part" represents weight part to 100 of the plating base material containing metal powder particles, hereafter the same). Both of the powder particles are denoted by a reference numeral 4. A plating base material 5 was made of an Ag plating layer of 102 $\mu$m and a Cu plating layer of 48 $\mu$m: both of the layers contained Ti and ZrB$_2$ powder particles.

The alumina ceramic cylinder 1, and the input part 2 and input base member 2' coated with diffusion platings at their bonding-side surfaces were piled up, and heated at 860° C. for 15 minutes under a vacuum pressure of $5 \times 10^{-5}$ mmHg, and cooled and taken out from the furnace. As the result, there was obtained, as shown in FIG. 1, a bonded assembly made of ceramics and metal with good airtightness.

EXAMPLE 7

Figure 3:
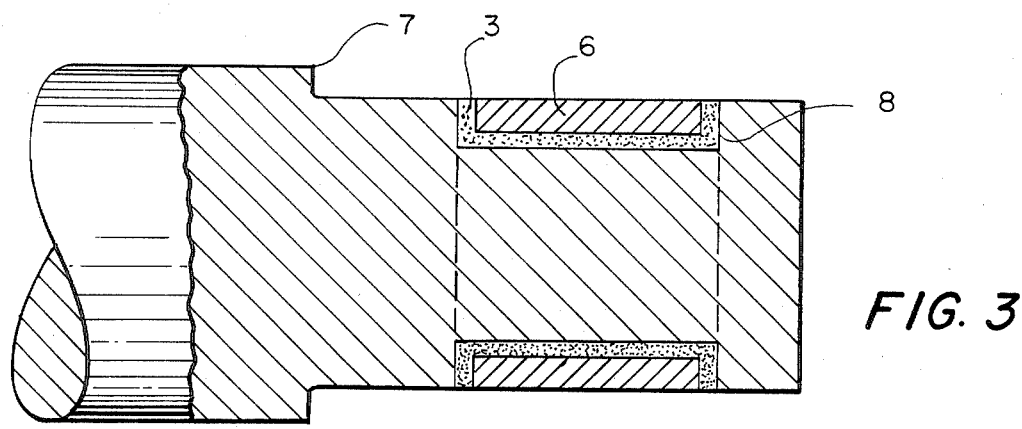
FIG. 3 is a cross-secitional view of a shaft having a chemical bonding between a ceramic spraying layer and a metallic structural member according to the second invention.

FIG. 3 is a cross-sectional view of a shaft having a chemical bonding between a ceramic spraying layer and a metallic structural member according to the invention. A shaft 7 was made of Cr-Mo steel and was coated with a ceramic spraying layer 6 at all around a lip sliding surface to improve wear resistance.

The shaft 7, an example of the metallic structural member, was beforehand formed with a groove 8 having a depth corresponding to the estimated thickness of the spraying layer 6, and coated with a composite plating layer 3 of 100 $\mu$m at the groove 8 only.

The composite plating layer 3 contained 6% Ti powder particles, 0.2% Mn powder particles, 0.2% Mo powder particles, and one-part TiB$_2$ powder particles. The plating base material was made of Ag and Cu lami-

TABLE 7

| Brazing Filler Metal Powder (1) (%) | Heating Condition | Combination of (2) Members to be Bonded | Bending Strength $\sigma$ max (kg/mm$^2$) |
|---|---|---|---|
| 70 Ag, 18.5 Cu, 7 Ti, 0.5 Mo, 1 Mn, 3 ZrB$_2$ | 860° C., 15 Minutes | A | 13.68 |
| 63.4 Ag, 24.6 Cu, 8 Ti, 3 Ni, 0.5 Mo, 0.5 Mn | 900° C., 15 Minutes | B | 3.96 |

Note (1): Mn is added as mother alloy powder of 50% Cu and 50% Mn, Mo is added as mother alloy powder of 80% Mo and 20% Ti, and other elements are added as pure metals or compounds powder.
Note (2): A - Tungsten carbide rectangular pallalelopiped and silicon nitride ceramic disk.
B - Tungsten carbide rectangular pallalelopiped and silicon carbide ceramic disk.
Note (3): No braking of brazing filler metal part but ceramic braking.

nated layers: their thickness ratio is 68 μm to 32 μm. These laminated layers were further coated all around with white alumina powder for spraying by the plasma spraying method with a thickness of 0.5 mm.

After the ceramic spraying, the shaft 7, an example of the metallic structural member, was heated at 860° C. for 15 minutes under a vacuum pressure of $1\times10^{-4}$ mmHg, and cooled and taken out from the furnace. As the result, there was obtained a shaft having chemical bonding between a ceramic spraying layer and a metallic structural member.

After the above chemical bonding, the outer circumference of the ceramic spraying region was ground.

EXAMPLE 8

A ceramic disk with 80% alumina content was activated by sensitizer and activator, and coated with electroless Cu plating with a very thin thickness, and thereafter further coated, at only surface of, the bonding region, with Ag and Cu diffusion electroplating so as to contain Ti-containing powder particles with the amount shown in Table 8. The thickness ratio of Ag composite plating to Cu composite plating was 102 μm to 48 μm. The both composite platings contained Ti-containing powder particles. A 80% alumina pipe was placed on the bonding region of the alumina disk coated with the above composite platings, and they were heated at 860° C. or 870° C. for 10 minutes under a vacuum pressure of $1\times10^{-4}$ mmHg, and cooled in the furnace and taken out to obtain bonded samples.

The bonding property for each bonded sample will be shown in Table 8 below.

TABLE 8

| Ti-containing Powder Particles | | | Plating Base Material | Heating Temperature (°C.) | Combination (1) of Members to be Bonded | Bending Strength (2) $\sigma_{max}$ (kg/mm$^2$) |
|---|---|---|---|---|---|---|
| Metal Component (%) | Kind of Ti or Zr Compound | (Part) | | | | |
| 0.5 Ti | — | | Weight Ratio of Ag/Cu is 72/28 | 860 | A | 0.80 (*1) |
| 1.0 Ti | — | | | | | 0.57 (*1) |
| 5.0 Ti | — | | | | | 3.07 (*2) |
| 7.0 Ti | — | | | | | 2.84 (*2) |
| 10.0 Ti | — | | | | | 4.32 (*2) |
| 6.0 Ti | ZrB$_2$ | (0.1) | | 870 | | 6.26 (*2) |
| 6.0 Ti | ZrB$_2$ | (0.5) | | | | 5.12 (*2) |
| 6.0 Ti | ZrB$_2$ | (1.0) | | | | 7.73 (*2) |
| 6.0 Ti | ZrB$_2$ | (3.0) | | | | 6.94 (*2) |
| 6.0 Ti | ZrB$_2$ | (5.0) | | | | 6.60 (*2) |

Note (1): A - 80% alumina disk and 80% alumina cylinder.
Note (2): *1 - Braking of composite plating part.
*2 - No braking of diffusion plating part but ceramic braking.

EXAMPLE 9

Samples were prepared with the same manner as example 3, and had the blending composition shown in Table 4. The thus prepared samples were heated at 880° C. or 900° C. for 10 minutes, and cooled in the furnace to obtain bonded samples.

The bonding property for each bonded sample will be shown in Table 9 below.

TABLE 9

| Ti-Containing Powder Particles Component (%) | Plating Base Material | Heating Temperature (°C.) | Combination (1) of Members to be Bonded | Bending Strength (2) $\sigma_{max}$ (kg/mm$^2$) |
|---|---|---|---|---|
| 6 Ti, 0.02 Mo, 0.02 Mn | Weight Ratio 0f Ag/Cu is 72/28 | 870 | A | 3.75 (*2) |
| 6 Ti, 0.2 Mo, 0.2 Mn | | | | 3.75 (*2) |
| 6 Ti, 3 Mo, 3 Mn | | | | 4.21 (*2) |
| 6 Ti, 0.02 Mo, 0.02 Cr | | 900 | | 3.75 (*2) |

Note (1): A - 80% alumina disk and 80% alumina cylinder.
Note (2): *2 - No braking of composite plating part but ceramic braking.

EXAMPLE 10

Samples were prepared with the same manner as example 3, and had the blending composition shown in Table 5. The thus prepared samples were heated at 860° C., 880° C. or 890° C. for 10 minutes, and cooled in the furnace to obtain bonded samples.

The bonding property for each sample will be shown in Table 10 below.

TABLE 10

| Ti-containing Powder Particles | | | Plating Base Material | Heating Temperature (°C.) | Combination (1) of Members to be Bonded | Bending Strength (2) $\sigma_{max}$ (kg/mm$^2$) |
|---|---|---|---|---|---|---|
| Metal Component (%) | Kind of Ti or Zr Compound | (Part) | | | | |
| 6 Ti, 0.01 Mo, 0.01 Mn | ZrB$_2$ | (0.1) | Weight Ratio of Ag/Cu is 72/28 | 860 | A | 5.46 (*2) |
| 6 Ti, 0.01 Mo, 0.01 Mn | TiB$_2$ TiN | (0.1) (0.1) | | | | 5.12 (*2) |
| 6 Ti, 0.005 Mo, 0.005 Cr | TiB$_2$ TiN | (0.1) (0.1) | | | | 4.78 (*2) |
| 6 Ti, 0.005 Mo, 0.005 Cr | ZrB$_2$ | (0.1) | | | | 5.12 (*2) |
| Same as above | ZrB$_2$ | (0.5) | | 890 | | 4.03 (*2) |
| Same as above | ZrB$_2$ | (1) | | | | 3.46 (*2) |
| Same as above | ZrB$_2$ | (5) | | | | 3.91 (*2) |
| Same as above | ZrB$_2$ | (10) | | | | 3.34 (*2) |
| Same as above | ZrB$_2$ | (20) | | | | 3.00 (*1) |

TABLE 10-continued

| Ti-containing Powder Particles | | | | Heating | Combination (1) | |
|---|---|---|---|---|---|---|
| Metal Component | Kind of Ti or Zr | | Plating Base | Temperature | of Members to | Bending Strength (2) |
| (%) | Compound | (Part) | Material | (°C.) | be Bonded | $\sigma_{max}$ (kg/mm$^2$) |
| Same as above | TiB$_2$ | (1) | | 880 | | 2.93 (*2) |
| Same as above | TiB$_2$ | (5) | | | | 3.68 (*2) |
| Same as above | TiN | (5) | | | | 5.35 (*2) |
| Same as above | TiC | (1) | | | | 3.12 (*2) |
| Same as above | ZrC | (1) | | 890 | | 3.05 (*2) |

Note (1): A - 80% alumina disk and 80% alumina cylinder.
Note (2): *1 - Braking of composite plating part.
*2 - No braking of composite plating part but ceramic braking.

EXAMPLE 11

A tungsten carbide member (a parallelopiped of 5 mm×11 mm×14 mm) had a 5 mm×11 mm surface to be bonded, which surface was coated with Ag and Cu electroplating so as to contain Ti-containing powder particles with the composition shown in Table 11. The thickness ratio of the Ag composite plating to Cu composite plating was 102 μm to 48 μm. The both composite platings contained Ti-containing powder particles. The thus prepared bonding surface was placed on a silicon nitride disk (32 mm in diameter and 3 mm in thickness). The thus prepared assemblies were heated at 860° C. for 10 minutes under a vacuum pressure of $1\times10^{-4}$, and cooled in the furnace and taken out to obtain bonded samples.

The bonding property for each sample will be shown in Table 11 below.

TABLE 11

| Ti-containing Powder Particles | | | | Heating | Combination (1) | |
|---|---|---|---|---|---|---|
| Metal Component | Kind of Ti or Zr | | Plating Base | Temperature | of Members to | Bending Strength (2) |
| (%) | Compound | (Part) | Material | (°C.) | be Bonded | $\sigma_{max}$ (kg/mm$^2$) |
| 6 Ti, 0.01 Mo, 0.01 Mn, 0.1 Co | — | | Weight Ratio of Ag/Cu is 72/28 | 870 | C | 2.62 (*2) |
| 6 Ti, 0.005 Mo, 0.005 Cr, 0.1 Ni | — | | | | | 4.84 (*2) |
| 6 Ti, 0.005 Mo, 0.005 Cr, 0.5 Fe, 0.5 Ni | — | | | 880 | | 6.48 (*2) |
| 7 Ti, 0.2 Mo, 0.2 Mn, 1 Ni | — | | | 885 | | 6.12 (*2) |
| 7 Ti, 0.2 Mo, 0.2 Mn, 5 Ni | — | | | | | 5.40 (*1) |
| 7 Ti, 0.2 Mo, 0.2 Mn, 3 Co | — | | | | | 11.16 (*2) |
| 7 Ti, 0.2 Mo 0.2 Mn, 3 Fe | — | | | | | 7.19 (*2) |
| 6 Ti, 0.01 Mo, 0.01 Mn | ZrB$_2$ | (0.1) | | 860 | B | 9.72 (*2) |
| 6 Ti, 0.01 Mo, 0.01 Mn | TiB$_2$ TiN | (0.1) (0.1) | | | | 23.01 (*2) |
| 6 Ti, 0.005 Mo, 0.005 Cr | ZrB$_2$ | (0.1) | | | | 7.21 (*2) |
| 6 Ti, 0.005 Mo, 0.005 Cr | TiB$_2$ TiN | (0.1) (0.1) | | | | 13.72 (*2) |

Note (1): B - Tungsten carbide rectangular pallalelopiped and silicon nitride disk.
C - Tungsten carbide rectangular pallalelopiped and silicon carbide disk.
Note (2): *1 - Braking of composite plating part.
*2 - No braking of diffusion plating part but ceramic braking.

EXAMPLE 12

The metallic and alumina members shown in Table 12 were prepared with 10 mm in diameter and 30 mm in length, and each of them had one end surface to be bonded, which end surface was placed on an alumina ceramic cylinder. The thus prepared assemblies were, in the same manner as example 6 and 9, heated at 870° C. for 10 minutes, and thereafter cooled in the furnace to obtain bonded samples. The bonding property for each sample will be shown in Table 12 below.

TABLE 12

| Ti-containing Powder Particles | | | | Heating | Combination (1) | |
|---|---|---|---|---|---|---|
| Metal Component | Kind of Ti or Zr | | Plating Base | Temperature | of Members to | Bending Strength (2) |
| (%) | Compound | (Part) | Material | (°C.) | be Bonded | $\sigma_{max}$ (kg/mm$^2$) |
| 6 Ti | ZrB$_2$ | (0.5) | Weight Ratio of Ag/Cu is 72/28 | 870 | D | 3.00 (*2) |
| | | | | | E | 3.61 (*2) |
| | | | | | F | 4.50 (*2) |
| 6 Ti | ZrB$_2$ | (3) | | | D | 2.72 (*2) |
| | | | | | E | 3.01 (*2) |

TABLE 12-continued

| Ti-containing Powder Particles | | | | Heating | Combination (1) | |
|---|---|---|---|---|---|---|
| Metal Component (%) | Kind of Ti or Zr Compound | (Part) | Plating Base Material | Temperature (°C.) | of Members to be Bonded | Bending Strength (2) $\sigma_{max}$ (kg/mm²) |
| | | | | | F | 3.25 (*2) |

Note (1): D - 80% alumina and pure copper.
E - 80% alumina and Kovar alloy (29Ni—16Co—Fe alloy).
F - 80% alumina and 93% alumina.
Note (2): *2 - No braking of diffusion plating part but ceramic braking.

Figure 4:
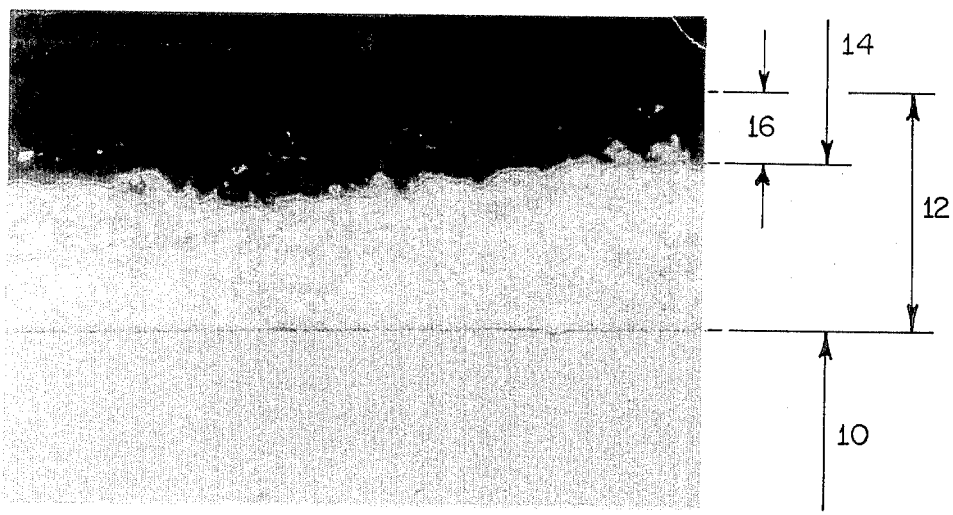
FIG. 4 is a photomicrograph showing the mutually diffused layer at the boundary of the ceramic and the brazing filler metal.

As described above, the method of the present invention results in a mutually diffused layer in the boundary between the ceramic and the brazing filler metal. As may be seen in FIG. 4, a stainless steel member 10 (SUS430(JIS)) has a brazing filler metal layer 12 thereon onto which a layer of ceramic (aluminum) 14 has been thermally sprayed. As shown in the figure, the brazing filler metal has been dispersed into the porous portion of the ceramic, i.e., pores of about 50 microns, over the interface 16 and disassociated particles of the ceramic are dispersed into the filler metal. A complete chemical bonding between the ceramic and the brazing filler metal is thus achieved.

What is claimed is:

1. A method of bonding ceramics and metal, or bonding similar ceramics together, or bonding dissimilar ceramics comprising the steps of:
   providing, on each bonding region, titanium particles and brazing filler metal alloyable with the titanium and having a lower melting point than the titanium; and
   heating them in vacuum at a temperature which is higher than the melting point of the brazing filler metal but permits titanium to remain solid, so that some of the titanium particles are diffused into the brazing filler metal.

2. A method of bonding ceramics and metal, or bonding similar ceramics together, or bonding dissimilar ceramics according to claim 1, wherein the method further comprises the step of providing, on each bonding region, at least one or more kinds of compounds selected from a group consisting of nitride, carbide and boride of titanium or zirconium, together with the titanium particles and the brazing filler metal.

3. A method of bonding ceramics and metal, or bonding similar ceramics together, or bonding dissimilar ceramics comprising the steps of:
   applying, to each bonding region, composite plating which contains plating base material made of metal or alloy alloyable with titanium or Ti-containing particles and having a lower melting point than the titanium or Ti-containing particles, and which has titanium particles or Ti-containing particles diffused into the plating base material; and
   heating them in vacuum at a temperature which is higher than the melting point of the plating base material but permits the titanium particles or Ti-containing particles to remain solid, so that the titanium particles or Ti-containing particles are diffused into the metal or alloy constituting the plating base material.

4. A method of bonding ceramics and metal, or bonding similar ceramics together, or bonding dissimilar ceramics according to claim 3, wherein the composite plating on each bonding region is diffusion plating into which molybdenum particles and manganese particles are diffused together with the titanium particles.

5. A method of bonding ceramics and metal, or bonding similar ceramics together, or bonding dissimilar ceramics according to claim 3, wherein the composite plating on each bonding region is composite plating into which molybdenum particles and chromium particles are diffused together with the titanium particles.

6. A method of bonding ceramics and metal, or bonding similar ceramics together, or bonding dissimilar ceramics according to claim 4, wherein the composite plating on each bonding region is composite plating into which at least one or more kinds of particles selected from a group consisting of nickel, cobalt and iron particles are diffused together with the titanium, molybdenum and manganese particles.

7. A method of bonding ceramics and metal, or bonding similar ceramics together, or bonding dissimilar ceramics according to claim 3, wherein the composite plating on each bonding region is composite plating into which at least one or more kinds of particles selected from a group consisting of particles of nitride, carbide and boride of titanium or zirconium are diffused together with the titanium particles 8. A method of bonding ceramics and metal comprising the steps of:
   applying, to a surface of the metal, composite plating which contains plating base material made of metal or alloy alloyable with titanium particles or Ti-containing particles and having a lower melting point than the particles, and which contains titanium particles and Ti-containing particles diffused into the plating base material;
   coating a surface of the composite plating with a ceramic layer by thermal spraying; and
   heating them in vacuum at a temperature which is higher than the melting point of the plating base material but permits the titanium particles or Ti-containing particles to remain solid, so that at least the Ti-containing particles are diffused into the metal or alloy constituting the plating base material.

9. A method of bonding ceramics and metal according to claim 8, wherein the composite plating on the surface of the metal is composite plating into which molybdenum particles and manganese particles are diffused together with the titanium particles.

10. A method of bonding ceramics and metal according to claim 8, wherein the composite plating on the surface of the metal is composite plating into which molybdenum powder particles and chromium particles are diffused together with the titanium particles.

11. A method of bonding ceramics and metal according to claim 9 wherein the composite plating on a surface of a metallic structural member is composite plating into which at least one or more kinds of particles selected from a group consisting of nickel, cobalt and iron particles are diffused together with the titanium, molybdenum and manganese particles.

12. A method of bonding ceramics and metal according to claim 8, wherein the composite plating on the surface of the metal is composite plating into which at least one or more kinds of particles selected from a group consisting of particles of nitride, carbide and boride of titanium or zirconium are diffused together with the titanium particles.

13. A method of bonding ceramics and metal, or bonding similar ceramics together, or bonding dissimilar ceramics according to claim 5, wherein the diffusion plating on each bonding region is diffusion plating into which at least one or more kinds of powder particles selected from a group consisting of nickel, cobalt and iron powder particles are diffused together with the titanium, molybdenum and manganese powder particles, or together with the titanium, molybdenum and chromium powder particles.

14. A method of bonding ceramics and metal according to claim 10, wherei the diffusion plating on a surface of a metallic structural member is diffusion plating into which at least one or more kinds of powder particles selected from a group consisting of nickel, cobalt and iron powder particles are diffused together with the titanium, molybdenum and manganese powder particles, or together with the titanium, molybdenum and chromium powder particles.

15. A method of bonding ceramics and metal, or bonding similar ceramics together, or bonding dissimilar ceramics according to claim 5, wherein the composite plating on each bonding region is plating into which at least one or more kinds of particles selected from a group consisting of nickel, cobalt and iron particles are diffused together with the titanium, molybdenum and chromium particles.

16. The method of claim 4 wherein the composite plating on each bonding region comprises particles selected from a group consisting of a nitride, carbide and boride of titanium or zirconium powder diffused together with the titanium, molybdenum and manganese particles.

17. The method of claim 5 wherein the composite plating on each bonding region comprises particles selected from a group consisting of a nitride, carbide and boride of titanium or zirconium diffused together with the titanium, molybdenum and chromium particles.

18. A method of bonding ceramics and metal, or bonding similar ceramics together, or bonding dissimilar ceramics according to claim 6 wherein the composite plating on each bonding region comprises particles selected from a group consisting of a nitride, carbide and boride of titanium or zirconium diffused together with the titanium, molybdenum and manganese particles and at least one or more kinds of particles selected from the group consisting of the nickel, cobalt and iron particles.

19. A method of bonding ceramics and metal, or bonding similar ceramics together, or bonding dissimilar ceramics according to claim 15 wherein the composite plating on each bonding region comprises particles selected from a group consisting of a nitride, carbide and boride of titanium or zirconium diffused together with the titanium, molybdenum and chromium particles and at least one or more kinds of particles selected from the group consisting of the nickel, cobalt and iron particles.

20. A method of bonding ceramics and metal according to claim 10 wherein the composite plating on a surface of a metallic structural member comprises particles selected from a group consisting of nickel, cobalt and iron particles diffused together with the titanium, molybdenum and chromium particles.

21. The method of claim 9 wherein the composite plating on each bonding region comprises particles selected from a group consisting of a nitride, carbide and boride of titanium or zirconium diffused together with the titanium, molybdenum and manganese particles.

22. The method of claim 10 wherein the composite plating on each bonding region comprises particles selected from a group consisting of a nitride, carbide and boride of titanium or zirconium diffused together with the titanium, molybdenum and chromium particles.

23. The method of claim 11 wherein the composite plating on the surface of the metal comprises particles selected from a group consisting of a nitride, carbide and boride of titanium or zirconium diffused together with the titanium, molybdenum and manganese particles and at least one or more kinds of particles selected from the group consisting of nickel, cobalt and iron particles.

24. A method of bonding ceramics and metal according to claim 20 wherein the composite plating on the surface of the metal comprises particles of a nitride, carbide and boride of titanium or zirconium diffused together with the titanium, molybdenum and chromium particles and at least one or more kinds of particles selected from the group consisting of the nickel, cobalt and iron particles.

* * * * *